United States Patent [19]

Mazzamuto et al.

[11] Patent Number: 5,665,953
[45] Date of Patent: Sep. 9, 1997

[54] SELF-CONTAINED PERSONAL DATA COLLECTOR FOR REDEEMING COUPONS

[75] Inventors: Anthony Mazzamuto, Tarzana; Ricardo L. Lozano, Sherman Oaks, both of Calif.

[73] Assignee: Lobar Code Inc.

[21] Appl. No.: 601,265

[22] Filed: Feb. 14, 1996

[51] Int. Cl.$^6$ .................................................. G06K 15/00
[52] U.S. Cl. ........................... 235/383; 235/375; 235/487
[58] Field of Search ...................................... 235/375, 383, 235/487

[56] References Cited

U.S. PATENT DOCUMENTS

| | | |
|---|---|---|
| 5,008,519 | 4/1991 | Cunningham et al. |
| 5,047,614 | 9/1991 | Bianco |
| 5,091,634 | 2/1992 | Finch et al. |
| 5,128,520 | 7/1992 | Rando et al. |
| 5,185,695 | 2/1993 | Pruchnicki |
| 5,192,854 | 3/1993 | Counts |
| 5,208,445 | 5/1993 | Nahar et al. |
| 5,380,991 | 1/1995 | Valencia et al. |
| 5,399,844 | 3/1995 | Holland |
| 5,401,946 | 3/1995 | Weinblatt |
| 5,420,606 | 5/1995 | Begum et al. |
| 5,430,558 | 7/1995 | Sohaei et al. |
| 5,581,064 | 12/1996 | Riley et al. ............................. 235/383 |

*Primary Examiner*—Harold Pitts
*Attorney, Agent, or Firm*—Michael Zarrabian

[57] ABSTRACT

A self-contained personal data collector for redeeming product coupons having product code information in machine-readable form thereon, the data collector comprising: (a) a first memory device containing a product coupon list having a plurality of entries, each entry including product code information for a product; (b) a scanner for scanning machine-readable product code information from a coupon; (c) a comparator for comparing the scanned product code information with the entries of the product coupon list in the first memory device to find a match; (d) a display for displaying the matched product code information; (e) means for assigning a unique identifier to the matched product code information; and (f) a second memory device for storing a list of matched product code information and corresponding unique identifiers as individual item entries, wherein the item entries can be retrieved and tallied by a register at a product purchase location.

28 Claims, 10 Drawing Sheets

SELF-CONTAINED PERSONAL DATA COLLECTOR FOR REDEEMING COUPONS

BACKGROUND

The present invention relates to a system for redeeming coupons, and in particular to a self-contained personal data collector for scanning and storing product code information from coupons.

Product manufacturers use paper coupons to stimulate sales of their products by redeeming the value of the coupons against the purchase price of products. To take advantage of coupons, a purchaser must first find a coupon for a desired product in a newspaper or magazine, cut out the coupon, and carry a stack of coupons to a store for redemption. At the store, the purchaser must search through the stack of coupons to find the coupon for a desirable product and submit the coupon to a cashier who processes the coupon and handles the paper trail to the manufacturer. The process of collecting the coupons, searching in a stack of coupons to find the coupon for a particular product, and processing of the coupons by the store is quite time-consuming and inefficient.

To address these problems, scanner devices have been utilized to allow a user to scan product bar code information from coupons into the scanner device memory for storage and later downloading to a store register for redemption. Although such scanner devices allow a user to scan and store bar code information, the bar code is not processed within the scanner and the user is not provided with any feedback as to the nature of the information stored in the scanner device. Further, the user has no way of looking through the stored information to determine which coupon items have been scanned into the scanner device, or to delete unwanted items.

Existing systems utilize external peripheral devices and master processors for processing the scanned bar codes to manage the information stored in the scanner. Such systems also only address downloading raw bar codes from the scanner in order to alleviate the paper trail problem between the store and the manufacturer. It is highly desirable for a user to be able to scan coupons, receive feedback about the corresponding product, and manage the items stored in the scanner device, all by using a self-contained hand-held unit. As such, the user can carry the unit around without having to depend on external databases and peripheral devices for data processing and access to detailed product information. Existing systems do not provide a self-contained scanner unit where bar codes are scanned, decoded and processed while providing visual feedback to the user. Further, existing systems do not provide a user with the ability to interactively manage the information stored in the scanner at the user's convenience with meaningful feedback about the data stored in the scanner.

There is, therefore, a need for a self-contained personal data collector device which allows a user to scan product code information from coupons into a memory device, and receive feedback about the nature of the information stored in the memory device. There is also a need for such a device to provide a user with ability to interactively manage the list of items stored in the memory device.

SUMMARY

The present inventions satisfies these needs. The present invention provides a self-contained personal data collector for redeeming product coupons having product code information in machine-readable form thereon. The data collector comprises: (a) a first memory device containing a product coupon list having a plurality of entries, each entry including product code information for a product; (b) a scanner for scanning machine-readable product code information from a coupon; (c) a comparator for comparing the scanned product code information with the entries of the product coupon list in the first memory device to find a match; (d) a display for displaying the matched product code information; (e) means for assigning a unique identifier to the matched product code information; and (f) a second memory device for storing a list of matched product code information and corresponding unique identifiers as individual item entries, wherein the item entries can be retrieved and tallied by a register at a product purchase location.

The product code information on the coupon can be in bar code form and the product code information in each entry of the coupon list can include a UPC code and product information in ASCII form. The data collector can further comprise a converter for converting the scanned coupon information from bar code form to UPC code, and the comparator can compare the converted UPC code with the UPC code of each entry of the coupon list. Product information is displayed on the display in user-readable form allowing a user to receive meaningful feedback about stored items.

The data collector can further comprise input means for allowing a user to elect storing information in the data collector, and delete and display the information at the user's convenience.

The present invention also provides a system for redeeming product coupons, comprising the self-contained personal data collector described above, including means for downloading the item entries from the second memory device, and a register system located at a product purchase location to communicate with the downloading means of the data collector for retrieving and tallying the item entries in the second memory device of the data collector and for redemption of the tallied entries against corresponding products selected for purchase.

The present invention also provides a method of redeeming product coupons having product code information in machine-readable form thereon. The method comprises the steps of: (a) scanning machine-readable product code information from a coupon; (b) comparing the scanned product code information with a product coupon list stored in a first memory device to find a match, the list having a plurality of entries, each entry including product code information for a product; (c) displaying the matched product code information on a display; (d) assigning a unique identifier to the matched product code information; and (e) storing a list of matched product code information and corresponding unique identifiers as individual item entries in a second memory device, wherein the item entries can be retrieved and tallied by a register at a product purchase location.

DRAWINGS

These and other features, aspects and advantages of the present invention will become understood with reference to the following description, appended claims and accompanying drawings where:

DESCRIPTION

Figure 1:
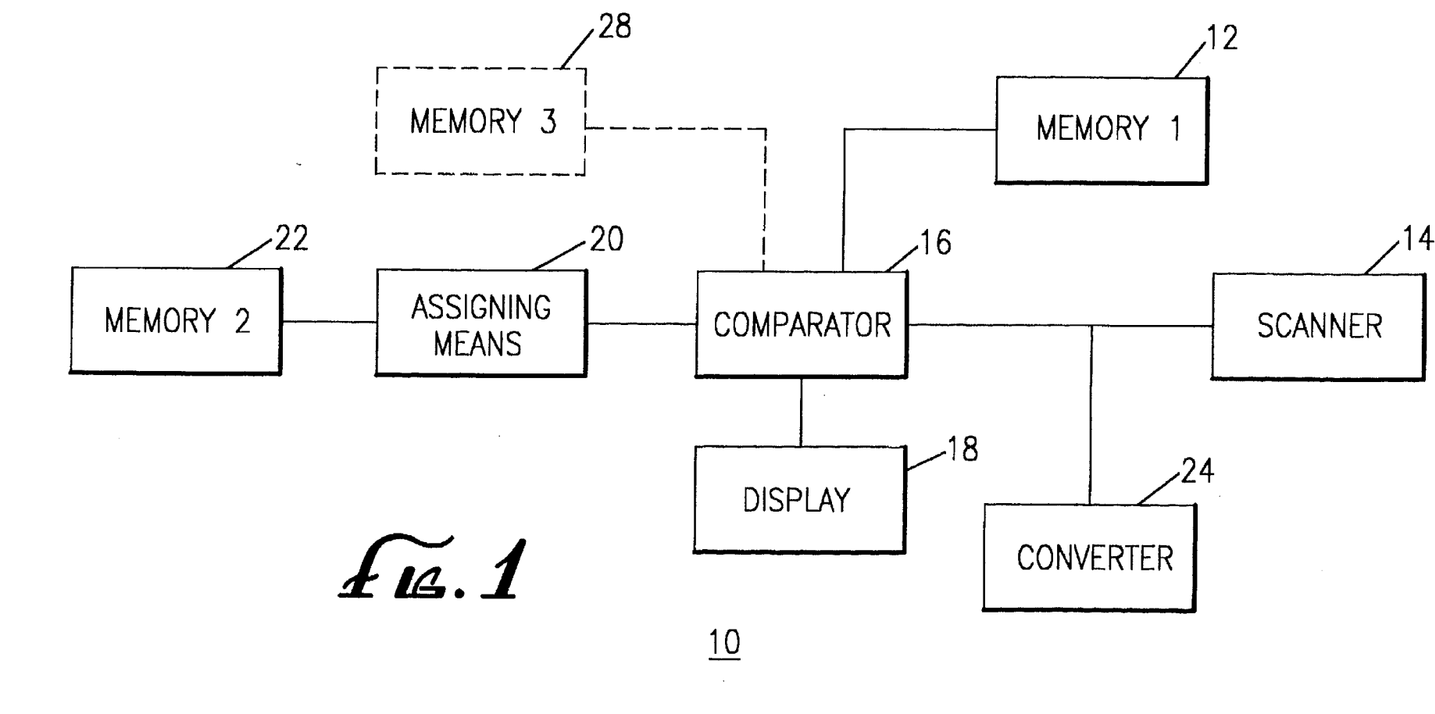
FIG. 1 is a block diagram of an embodiment of a self-contained data collector for redeeming product coupons according to the present invention.

Referring to FIG. 1, the present invention provides a self-contained personal data collector 10 for redeeming product coupons having product code information in machine-readable form thereon. The collector comprises: (a) a first memory device 12 containing a product coupon list having a plurality of entries, each entry including product code information for a product; (b) a scanner 14 for scanning machine-readable product code information from a coupon; (c) a comparator 16 for comparing the scanned product code information with the entries of the product coupon list in the first memory device 12 to find a match; (d) a display 18 for displaying the matched product code information; (e) means 20 for assigning a unique identifier to the matched product code information; and (f) a second memory device 22 for storing a list of matched product code information and corresponding unique identifiers as individual item entries, wherein the item entries can be retrieved and tallied by a register at a product purchase location.

Typically, the product code information on a coupon is in machine-readable bar code form. The product coupon list in the first memory device 12 includes entries of product code information for various products, wherein each entry includes a UPC code and product information in user-readable ASCII form. The product information can include coupon value, expiration date, product identification, and product description. The data collector 10 can further comprise a converter 24 for converting the scanned coupon information from bar code form to UPC code. The comparator 16 can compare the converted UPC code with the UPC code of each entry of the coupon list in the first memory device 12 to find a match. Because the converter 24 is a component part of the data collector 10, advantageously, there is no need for external converters or processors for converting and processing the scanned bar codes. This provides the user with a truly self-contained and portable data collector 10.

To account for unmatched product code information, the data collector 10 can further comprise a third memory device 28 for storing the scanned and unmatched bar code information for later retrieval and accounting by a register.

When a converted UPC code is matched, the corresponding product information in the list of the first memory device 12 is displayed on the display 18. As such, a user is provided with immediate feedback about the product code on the coupon, and the corresponding product information, including product description, price, and coupon expiration.

The assigning means 20 assigns a unique identifier to a matched product code information so that the matched product code information can be easily identified by a user via the unique identifier. The matched product code information and corresponding unique identifiers are stored as an entry in the second memory device 22 for later retrieval and accounting by a register at a product purchase location.

Preferably, the first memory device 12 is a non-volatile memory unit such as Read-Only Memory (ROM), Erasable Programmable Read-Only Memory (EPROM), or other non-volatile memory unit well-known to the practitioners in the art. A list of product code information is pre-stored in the first memory device 12. As such, advantageously, there is no need for an external database or peripheral device for access to detailed product information for user feedback. The pre-stored product information provides for a readily-available source of information within the data collector 10 enabling a user to conveniently view product information on the collector display 18.

The product code information for each entry includes: The UPC bar code numeric code, product description in ASCII, expiration date of the coupon, and the log number of the entry in the second memory device 22. The product code information can be stored in memory as a sequential list of entries for example. If the product code information in the first memory device 12 requires updating, the first memory device 12 can be replaced with another memory device containing updated product code information, or the first memory device 12 can be reprogrammed with the new product code information depending on the type of the memory unit.

The second and third memory devices, 22 and 28, respectively, can comprise memory units such as Random Access Memory (RAM) or other equivalent memory unit well-known to the practitioners in the art. The memory devices 22 and 28 are battery backed-up, so that scanned product code information can be stored in the memory devices and later deleted as desired. Alternatively, the memory devices 22 and 28 can comprise one memory unit partitioned into two separate memory address areas to represent the memory devices 22 and 28.

The scanner 14 is a standard scanner, well-known in the prior art. Specifically, the scanner 14 can comprise an emitter, a lens, and a detector. The emitter is a light source such as LED, laser, etc., that is focused by the lens into a beam appropriate for reading bar codes on a coupon. The detector detects the intensity of light reflected by the bar codes as data. The data is then passed to a scan-decoding circuit which converts it into data that can be processed. The scan-decoding circuit converts the sensed intensity signal into a digital signal representative of the bar code. The scan-decoding circuit translates the reflected light intensity from the detector into data, such as UPC, that can be processed by the comparator 16.

The display 18 can comprise a Liquid Crystal Display (LCD) or other display device suitable for use in a hand-held data collector 10 unit. Preferably, the display 18 unit consumes low amounts of electrical power such that the data collector 10 can be a battery-operated unit. The display 18 can be a two-line LCD display.

Figure 2:
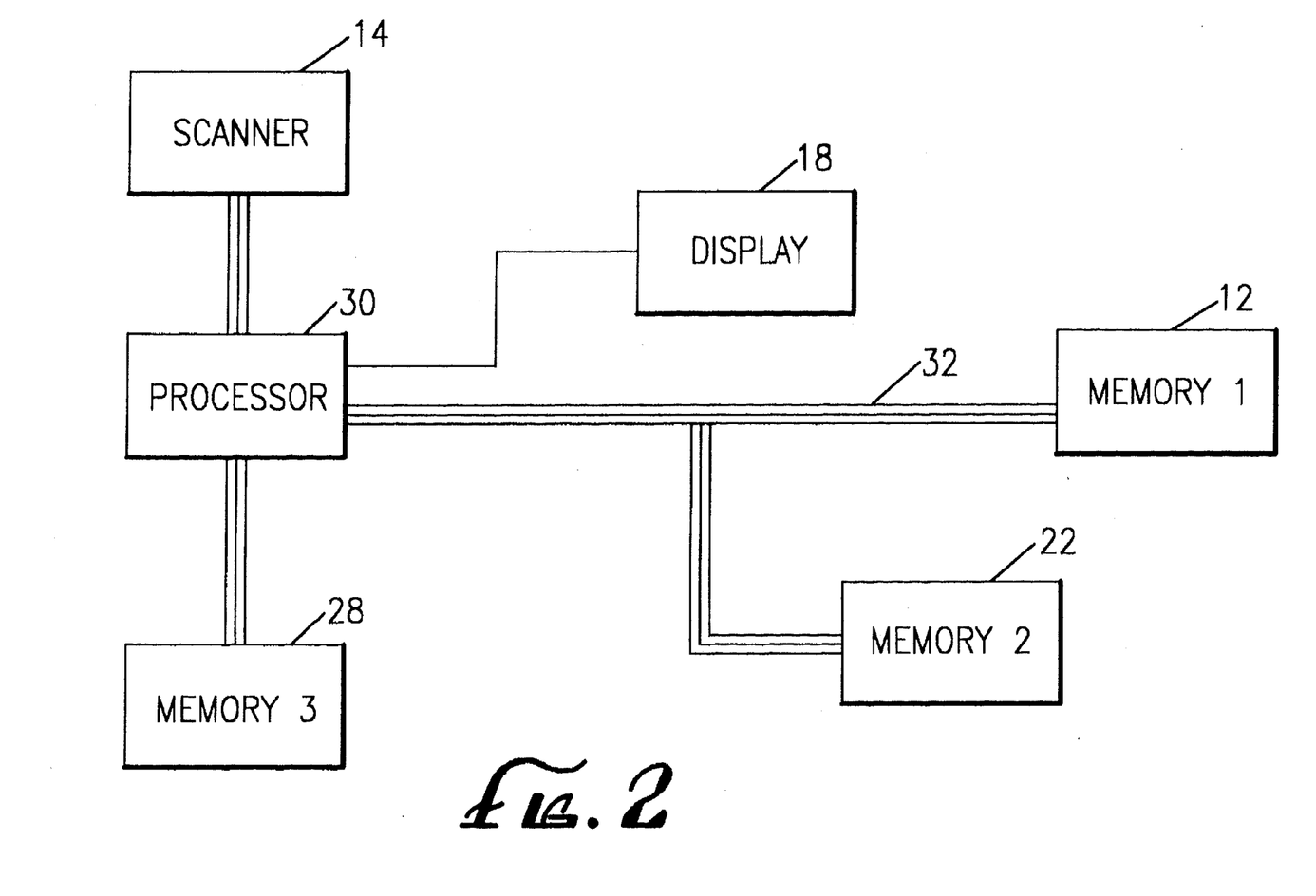
FIG. 2 is a block diagram of a microprocessor-based embodiment of the data collector of FIG. 1.

Referring to FIG. 2, the comparator 16, the assigning means 20 and the converter 24 can be components of a microprocessor unit 30. The microprocessor unit 30 is interconnected with the first memory device 12, the second memory device 22, the third memory device 28, and the scanner 14 via a system bus 32. The display 18 can be interconnected to the system bus 32, or directly coupled to the microprocessor. The microprocessor unit 30 is capable of storing program instructions to perform the following functions: (1) receiving scanned product code information from the scanner 14, (2) comparing the scanned product code information with the item entries in the first memory device 12 to find a match, (3) assigning a unique identifier to a matched product code information, (4) storing the matched product code information and corresponding unique identifier in the second memory device 22, and (5) storing unmatched product code information in the third memory device 28. The microprocessor unit 30 can also display the product code information on the display 18 whether the product code information is matched or unmatched. As such, the user is provided with feedback as to details of matched product code information, or simply an indication that the product code information was scanned from a coupon but was unmatched.

The microprocessor unit 30 includes a CPU, bus, internal memory for storing program instructions and data, and interface devices for interfacing with the scanner 14, the display 18, and the memory devices. A suitable CPU is an 8-bit "stamp" processor manufactured by United Micro Devices, including an IC high-speed decode driver, incorporating both decode and pass-through instructions. Other microprocessor units of similar capabilities can also be utilized.

Figure 3:
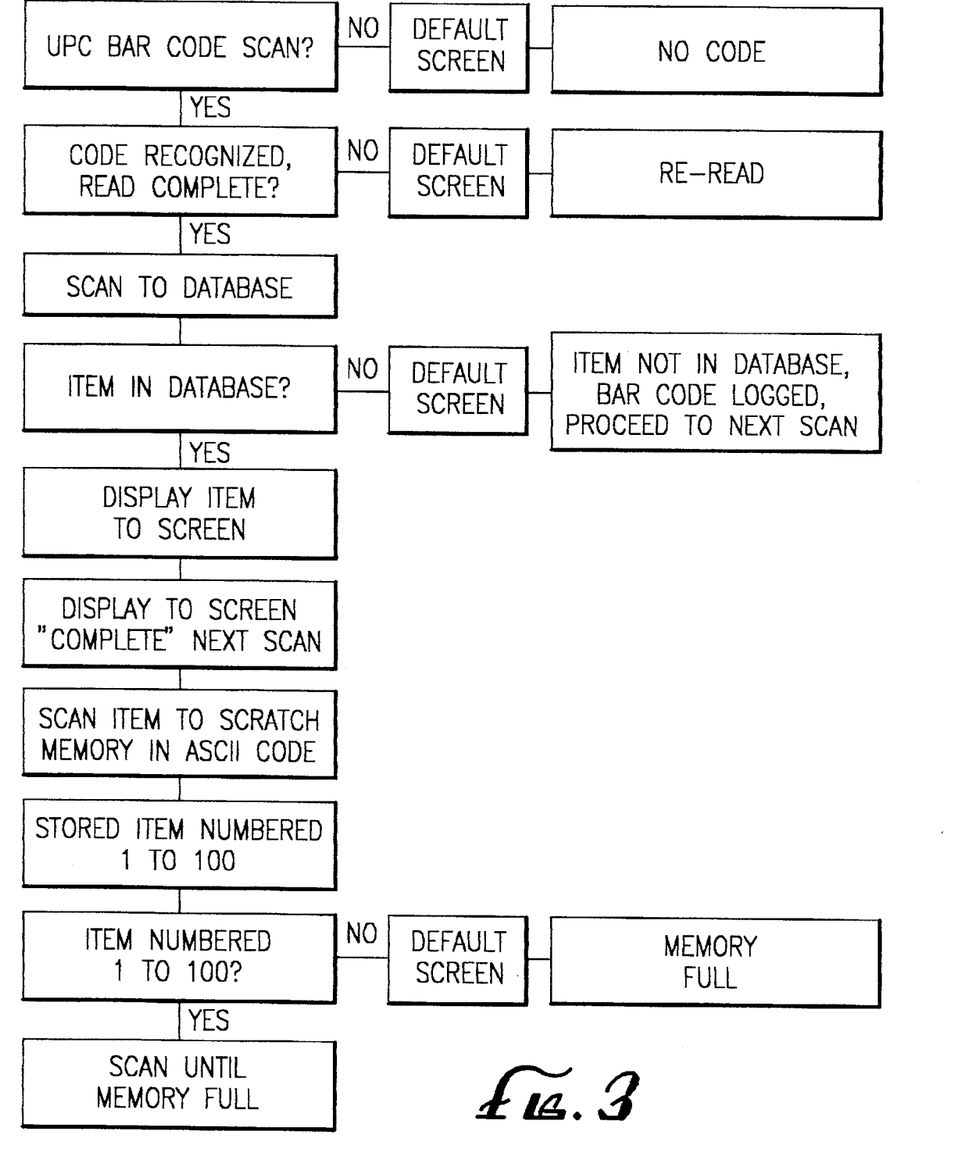
FIG. 3 is an embodiment of a pseudo-code program instruction for the microprocessor-based data collector of FIG. 2.

Referring to FIG. 3, an example pseudo code program for the program instructions of the microprocessor unit 30 for scanning a coupon utilizing the data collector 10 of the present invention is shown. The pseudo code program can be implemented in a programing language such as C or Basic as is well-known to practitioners in the art. According to the example pseudo code, so long as a coupon is not scanned by a user, the display 18 presents a message to the user indicating that no bar code has been scanned. When the bar code on a coupon is scanned, the microprocessor unit 30 determines whether scanning is complete, and whether the scanned bar code is recognized to be in proper format. The scanner 14 decoder converts the bar code to UPC bar code for comparison with the UPC codes stored in the first memory device 12. If scanning is incomplete, or the scanned bar code is not in proper format, the microprocessor unit 30 presents a message on the display 18 indicating that the coupon should be rescanned. Otherwise, the microprocessor unit 30 searches the UPC codes in the product coupon list in the first memory device 12 for a match for the converted UPC code.

If a match is not found, the microprocessor unit 30 presents a message on the display 18 informing the user that the scanned code is not in the list, and stores the scanned code in the third memory device 28, and displays a message on the display 18 to inform the user that the scanned bar code has been stored. If a match is found, the microprocessor unit 30 displays the matched product code information from the list in the first memory device 12 corresponding to the scanned bar code. Advantageously, this information provides the user with details of the corresponding product in user-readable form. The microprocessor unit 30 also displays a message on the display 18 indicating to the user that the scan process is complete. The microprocessor unit 30 then assigns a unique identifier to the scanned bar code, and stores the product code information and the unique identifier as an entry in the second memory device 22. The unique identifier can be a sequential number ranging from 1 to 100 or higher, depending on the capacity of the second memory device 22. The third memory device 28 can hold a minimum of 20 UPC bar codes. The first memory device 12 can store about 1,000 entries of product code information as detailed above.

If the second memory device 22 has reached capacity, the microprocessor unit 30 displays a message on the display 18 indicating to the user that the data collector 10 has reached capacity and the scanned bar code is not stored. Accordingly, a user can repeatedly scan a plurality of coupons until the data collector 10 has reached capacity. If a coupon is scanned more than once, the microprocessor unit 30 displays a message on the display 18 announcing that the scan is not accepted because it is in memory already.

Figure 4:
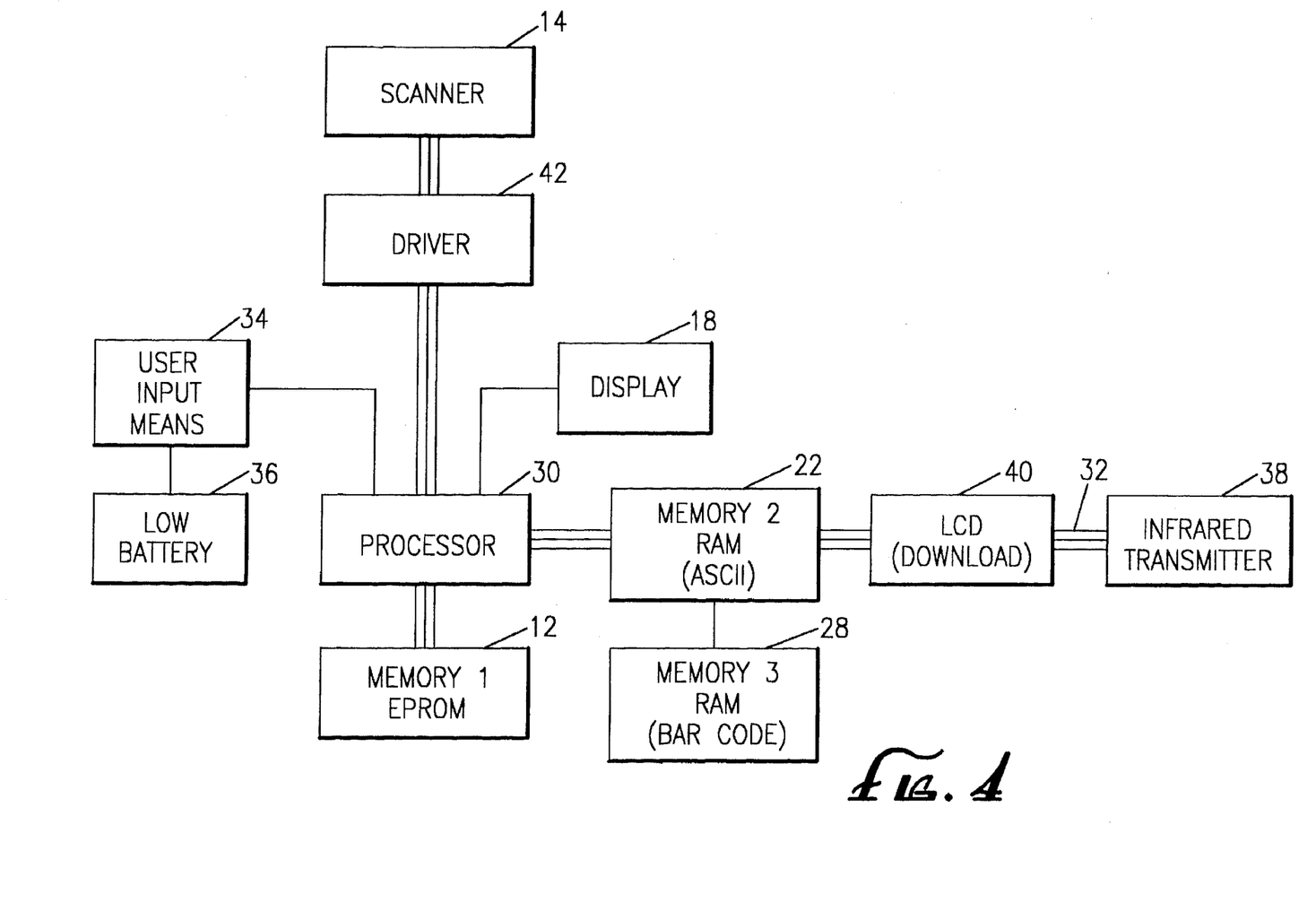
FIG. 4 is a block diagram of another embodiment of a self-contained microprocessor-based data collector for redeeming coupons according to the present invention.

Referring to FIG. 4, the data collector 10 can further comprise user-input means 34 for allowing a user to elect storing the matched product code information in the second memory device 22. Preferably, the user input means 34 further allows a user to delete an item entry from the list in the second and third memory devices 22 and 28, respectively. More preferably, the user-input means 34 further allows a user to display a catalog of the item entries stored in the second memory device 22 or the third memory devices 28 on the display 18. The invention also contemplates additional features for the input means 34 to allow a user to manage data stored in the first memory device 12, second memory device 22 and third memory device 28 such as printing such data on a printer.

The user-input means 34 can include a keypad, touch-sensitive buttons, or other user-input means well-known to the practitioners in the art. Preferably, there are three switches: a "scan" switch, a "delete" switch, and an "edit" switch. The scan switch is a constant on driver with a two-second time-out that the user must hold down to scan the bar code from a coupon. The delete and edit switches are single-shot flip-flop-controlled switches. The user-input means 34 is preferably an integrated part of the data collector 10 or, alternatively, a separate unit which can be electrically connected to the data collector 10 for user interaction and later detached as desired. As such, the microprocessor unit 30 can further include an interface unit for interfacing with the user-input means 34 to receive user commands. The microprocessor unit 30 can also include program instructions for processing the user commands for manipulating the item entries in the second memory device 22 and the third memory device 28, and for displaying the items on the display 18.

As shown in FIG. 4, the data collector 10 can further comprise a low-battery indicator 36 to indicate battery condition for a battery operated data collector, an infrared transmitter 38 for downloading data, a download indicator 40 for indicating a download mode, and a driver 42 for the scanner 14. The driver 42 includes the scanner 14 decoding circuits and amplifiers for amplifying digital signals from the scanner 14 for use by the scanner decoder as described above.

The data collector 10 can further comprise means for downloading the item entries from the second memory device 22 and the third memory device 28 to a register suitable for interfacing with the data collector 10 for receiving and processing the stored product code information. Preferably, the means for downloading includes program instructions for the microprocessor unit 30, and an infrared transmitter 38 for easily transmitting the stored data to a register having an infrared receiver. The infrared transmitter/receiver 38 can be of an infrared type 2 style to transmit data in digital form for processing. As such, the microprocessor unit 30 further includes an infrared transmitter interface device for allowing the microprocessor unit 30 to interface with the infrared transmitter 38. The interface device can be a straight in-line code/decode amplifier which routes infrared signals to the microprocessor unit 30 via the bus 32.

Figure 5:
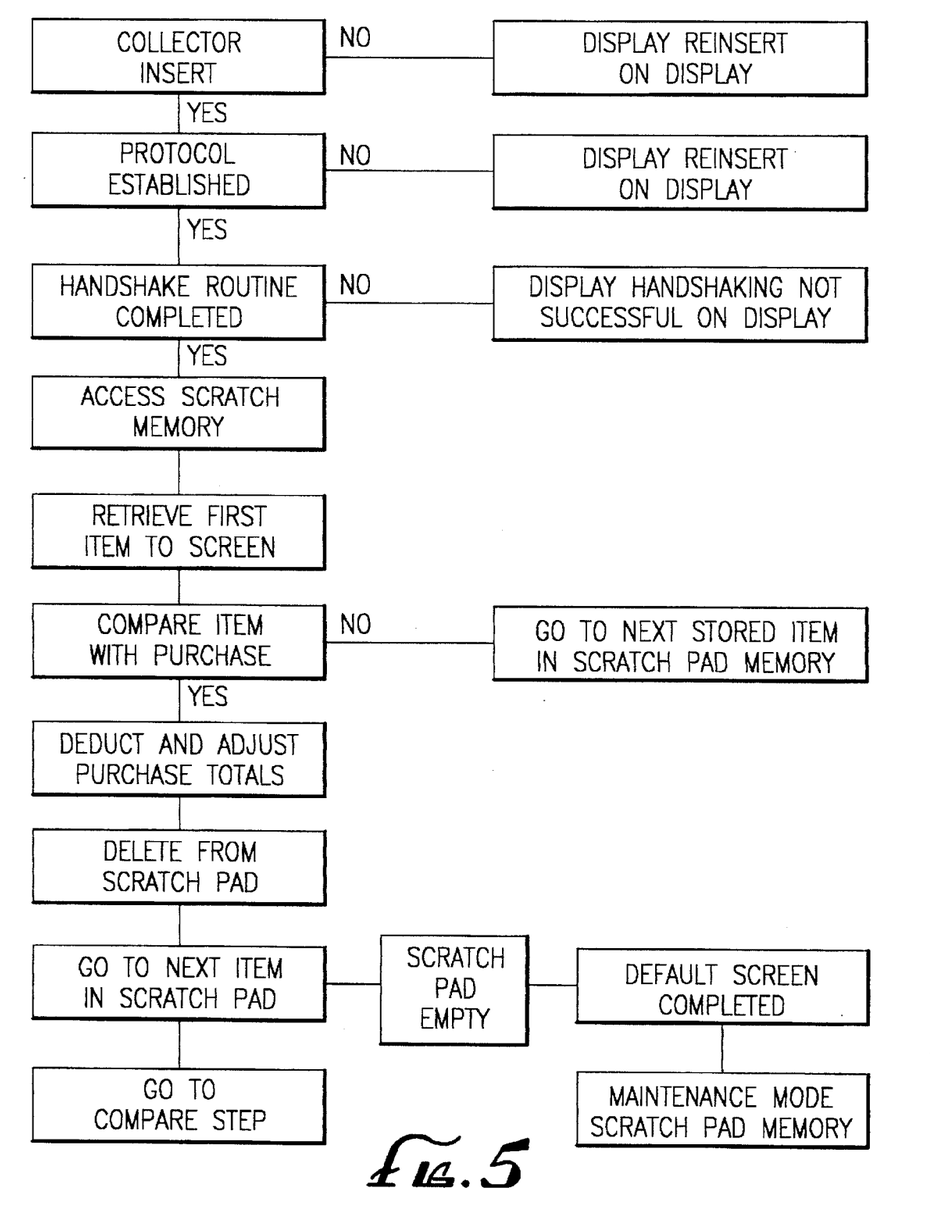
FIG. 5 is an embodiment of a pseudo-code program instruction for downloading data from the microprocessor-based data collector of FIG. 4.

Referring to FIG. 5, an example pseudo code program for the program instructions of the microprocessor unit 30 to download data from the data collector 10 to a register system is shown. To download data from the data collector 10 to the register system, the user inserts the collector in a housing within the register system to establish communication between the register system and the data collector 10. If the data collector 10 is not properly inserted in the register housing, the microprocessor unit 30 displays a re-insert message on the display 18 to inform the user that the data collector 10 must be properly re-inserted in the register system housing.

If the data collector 10 is properly inserted, the microprocessor unit 30 then attempts to establish connection with the register system utilizing a communication protocol such as a standard RS232 protocol. If the protocol is not successfully established, the microprocessor unit 30 displays a warning message on the display 18 to inform the user that the communication protocol has not been successfully established, and that the user should re-insert the data collector 10 into the register system housing for a retry.

If the protocol is properly established, the microprocessor unit 30 then attempts to establish handshaking with the register system. An example handshaking scenario can include the following sequential steps between the data collector 10 (dc) and the register (r):

1, r: device present
2, dc: device accepted
3, r: device clear to send
4, dc: clear to send
5, r: device ready to send
6, dc: ready to send
7, r: device transmit
8, dc: transmit
9, r: device transmission accepted
10, dc: transmission accepted
11, r: device transmission completed
12, dc: transmission completed
13, r: device inactive
14, dc: inactive If the handshaking is not properly established, the microprocessor unit 30 retries to establish handshaking, and also informs the user by displaying a message on the display 18 that proper handshaking has not been established. If handshaking has been established, the microprocessor unit 30 accesses the second memory device 22 to retrieve the first item entry to compare with a product item for purchase at the register. If the item entry is not matched with the product item, the microprocessor unit 30 accesses subsequential item entries in the second memory device 22 until a match is found.

When a match is found, the microprocessor unit 30 deducts the coupon value from the purchase price and adjusts a running total on the register. The microprocessor unit 30 then deletes the matched item entry from the second memory device 22 and proceeds to the next item entry in the second memory device 22 for a match with a next product item at the register. This procedure continues until all entries have been deleted from the second memory device 22, where the microprocessor unit 30 displays a message on the display 18 indicating that all item entries from the second memory device 22 have been downloaded. The microprocessor unit 30 performs the same steps for the entries in the third memory device 28 for each product item at the register. If a match is not found in the entries in either the second or third memory devices 22 or 28, respectively, the microprocessor unit 30 displays a message on the display 18 informing the user accordingly.

Preferably, after each coupon information is downloaded from the data collector 10 to the register, the data collector 10 enters a maintenance mode in which the microprocessor unit 30 performs memory management on the memory devices 22 and 28 to keep track of the existing entries in each of the memory devices 22 and 28, including deleting coupon entries from the memory devices 22 and 28 if the coupons have expired based on information derived from the audit trail database in the register.

Alternatively, the steps of deducting the coupon value from the purchase price, adjusting the running purchase total, and deleting the item entries in the memory devices 22 and 28 can be performed by commands to the microprocessor unit 30 from the register system.

Therefore, the downloading process consists of the placement of the data collector 10 in the register housing, whereupon successful handshaking the data collector 10 will download one coupon item at a time to the register, where the item will be compared with the current product data in an item processor in the register system. When a match is found, a transmission can be sent back to the data collector 10 informing the data collector 10 that the coupon has been accepted and the coupon is then deleted from the memory devices 22 or 28. At the same time, the item is handled at the item processor in the register in the same manner as if a coupon were being manually scanned through the register system 46 itself. Each coupon accepted is logged by an internal audit trail database in the register system 46. The audit trail database includes a running total of all coupons by product, manufacturer, redemption value, and date used. A monthly report can be generated from the database and invoices printed. The invoices include information about the manufacturer, the product, the product total, and the total coupons redeemed.

Figure 6:
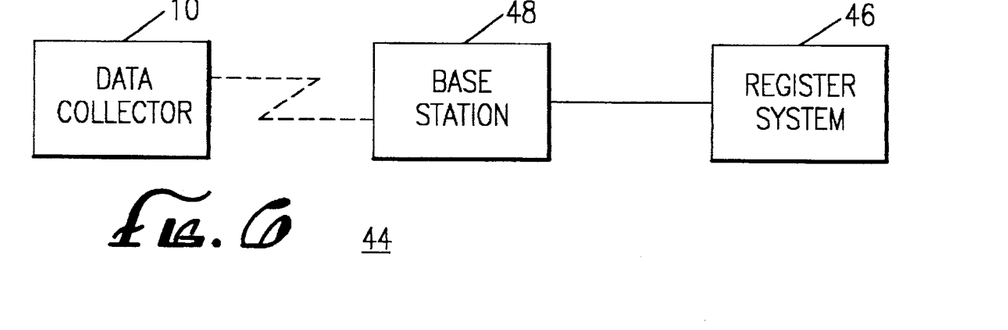
FIGS. 6–11 are block diagrams of an embodiment of a coupon redemption system according to another aspect of the present invention.

Referring to FIG. 6, in another aspect the present invention provides a system 44 for redeeming product coupons. The system 44 comprises a self-contained personal data collector 10 for reading product coupons having product code information in machine-readable form thereon, as described above. The system 44 further comprises a register system 46 located at a product purchase location to communicate with the downloading means of the data collector 10 for retrieving and tallying the item entries in the memory devices 22 and 28 of the data collector 10 and for redemption of the tallied entries against corresponding products selected for purchase. The register system 46 includes an item processor system with an audit trail database as described above.

Typically, the item processor system can be a minicomputer such as a Digital VAX System running under the VMS operating system. The database can be FoxPro or its equivalent. For distributed processing, a communication processor such as a Codex hub running Unix under TCP/IP can be used. The item processor database includes: all items sold in a retail establishment, item quantity in stock, item price, a UPC code number, rotation number, and a reorder quantity level. As the consumer purchases an item, the checker scans the item and creates a working file in the system 44 memory. The UPC code for the item is then utilized to obtain the item description which is displayed to the customer at the checker stand. The item is deducted from the inventory. When all desired items have been scanned in this manner, the checker scans any coupons the consumer has. The totals are then printed on the item processor terminal and stored in the item processor memory for a daily store balance.

According to the system of the present invention, the register system 46 includes a base station 48 to house the data collector 10 when interfacing with the item processor. The base station 48 includes the infrared receiver discussed above to communicate with the data collector 10.

The base station 48 further includes an infrared interface device and a decoding circuit to convert the infrared signals to "serial" digital signals to be processed by the item processor. Both the infrared interface device and the circuit are well-known to the art and can be of the type described for the data collector 10 above. In the item processor, the digital signals are no different from the situation where a checker manually scans coupons and representative digital signals are processed by the item processor. For example, for an item processor running under Unix, the digital signals are in compliance with the Unix system.

The present invention also provides a method of redeeming product coupons having product code information in machine-readable form thereon. The method comprises the steps of: (a) scanning machine-readable product code information from a coupon; (b) comparing the scanned product code information with a product coupon list stored in a first memory device to find a match, the list having a plurality of entries, each entry including product code information for a product; (c) displaying the matched product code information on a display; (d) assigning a unique identifier to the matched product code information; and (e) storing a list of matched product code information and corresponding unique identifiers as individual item entries in a second memory device, wherein the item entries can be retrieved and tallied by a register at a product purchase location.

Preferably, the product code information in the entries of the coupon list include UPC codes on product information in user-readable ASCII form. The method further comprises the steps of converting the scanned coupon information, typically in bar code form, to UPC code, and comparing the UPC code with the UPC code entries of the coupon list to find a match.

Preferably, the method further comprises the step of storing the scanned and unmatched bar code information in a third memory device for retrieval and accounting by a register. The product code information can include coupon value, expiration date, and product identification. Each item entry in the coupon list in the first memory device can include a product description to be displayed to a user.

The method can further comprise the step of accepting user input for allowing a user to elect storing the matched product code information in the second memory device, and to allow a user to delete an item entry from the second or the third memory devices. The step of accepting user input can further include the step of accepting user input to display a catalog of the item entries in the second or the third memory devices. The method can also include the step of downloading the item entries from the second and the third memory devices to a register at a product purchase location for tallying.

EXAMPLE

Figure 7:
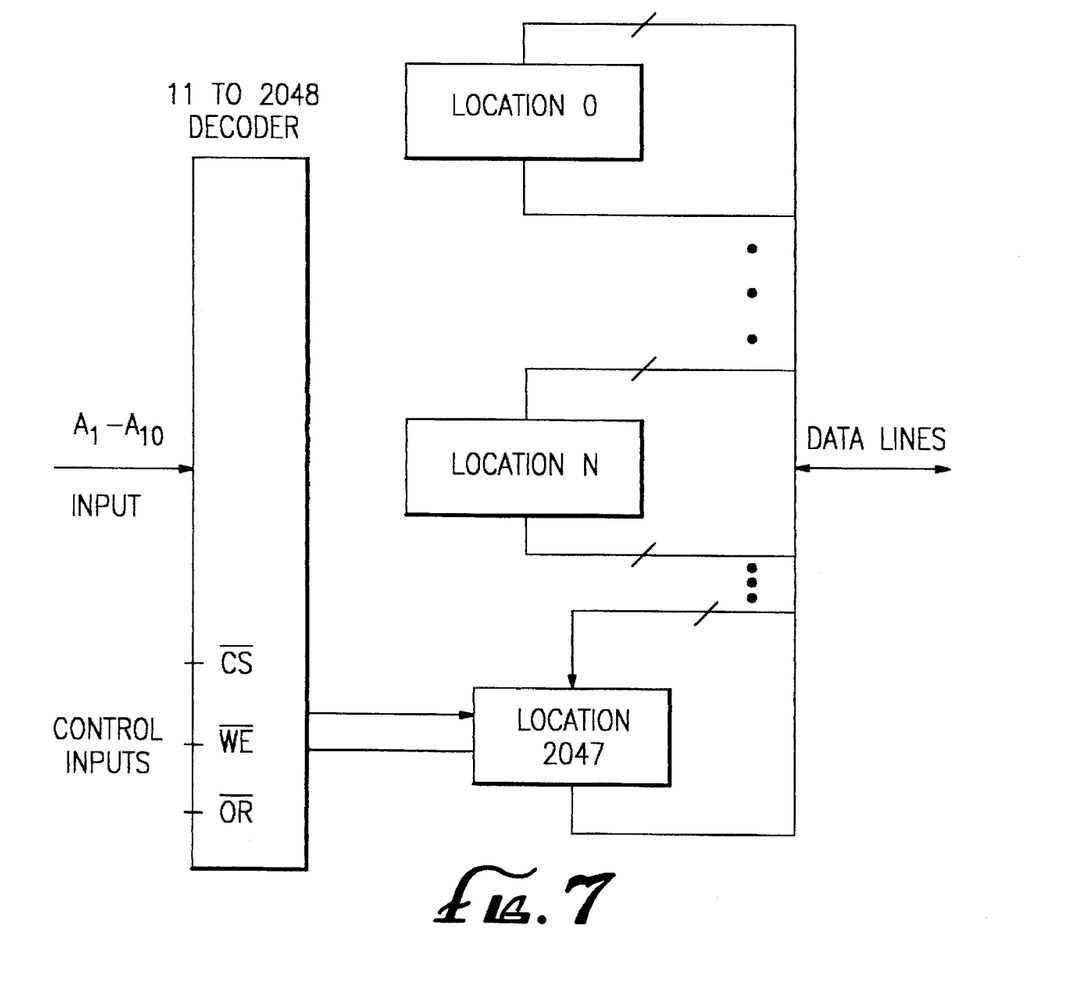

Referring now to FIG. 7, a block diagram of an example embodiment for a memory system for the data collector of the present invention is shown. The memory system utilizes RAM chips interconnected as shown. The RAM chips are manufactured by Texas Instruments, Hitachi and Gold Star. There are approximately 2,048 registers per RAM chip with 8 bits per register. Once a RAM address is decoded and located by the CPU, register to the address is available to either send or receive data.

Figure 8:
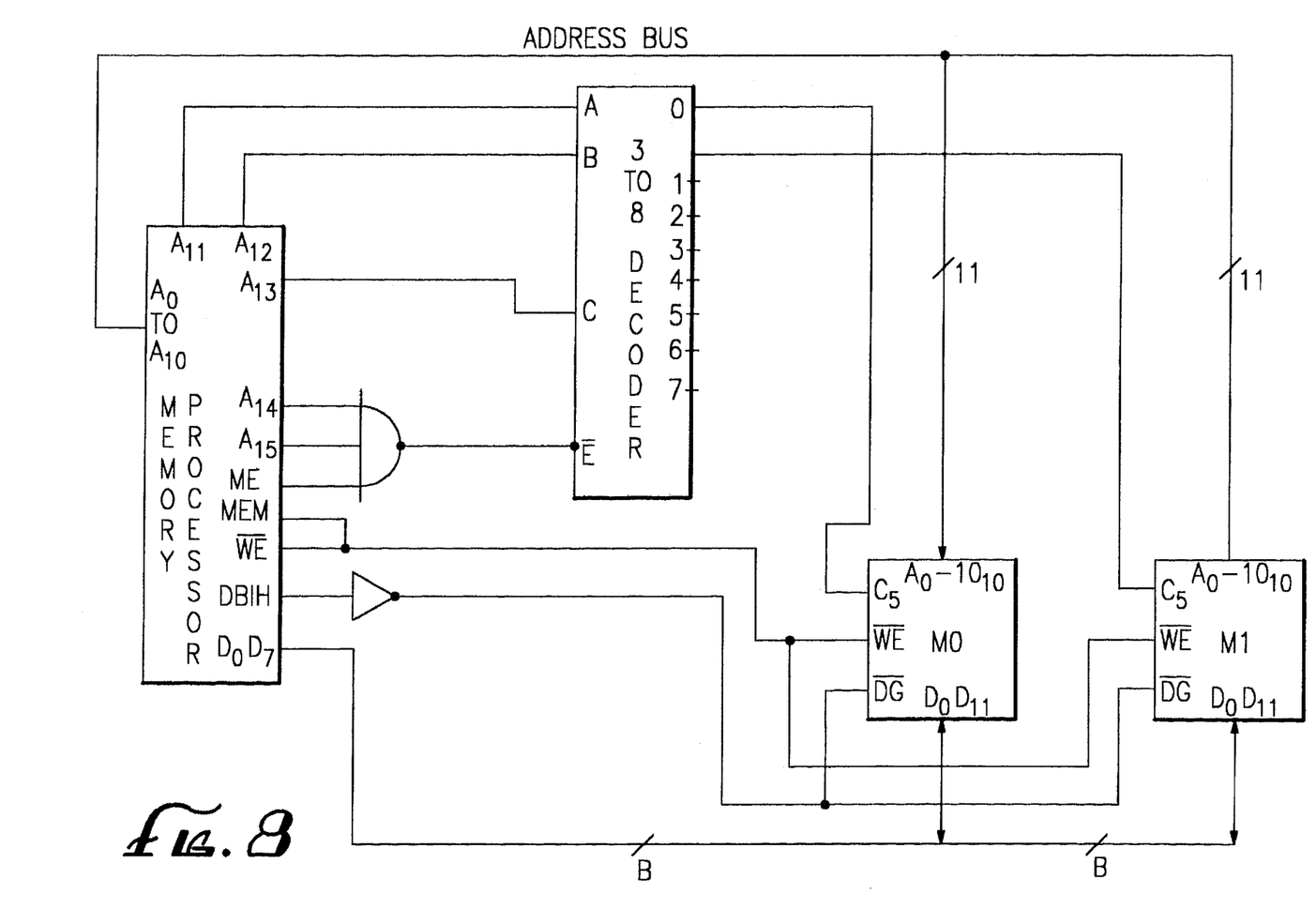

Referring to FIG. 8, a block diagram of an example embodiment of a database system of the first memory device for the data collector of the present invention is shown. The data base system includes a memory select decoder, and PROMs M0 and M1. The PROMs are manufactured by Motorola and Texas Instruments. The CPU controls the action of the PROMs M0 and M1 via the main data bus and requests data from the PROMs. The processor is an 8-bit "stamp" manufactured by API Stamp Technology. In operation, as the bar code reader scans a UPC bar code, the encoded/decoded information is sent to the CPU via the main the bus. The CPU then utilizes said information and queries the PROMs to determine if there is a match stored in the PROM memory. The match information is then sent via the bus back to the CPU. The CPU holds the internal clock that governs the timing on the bus for all bus actions.

Figure 9:
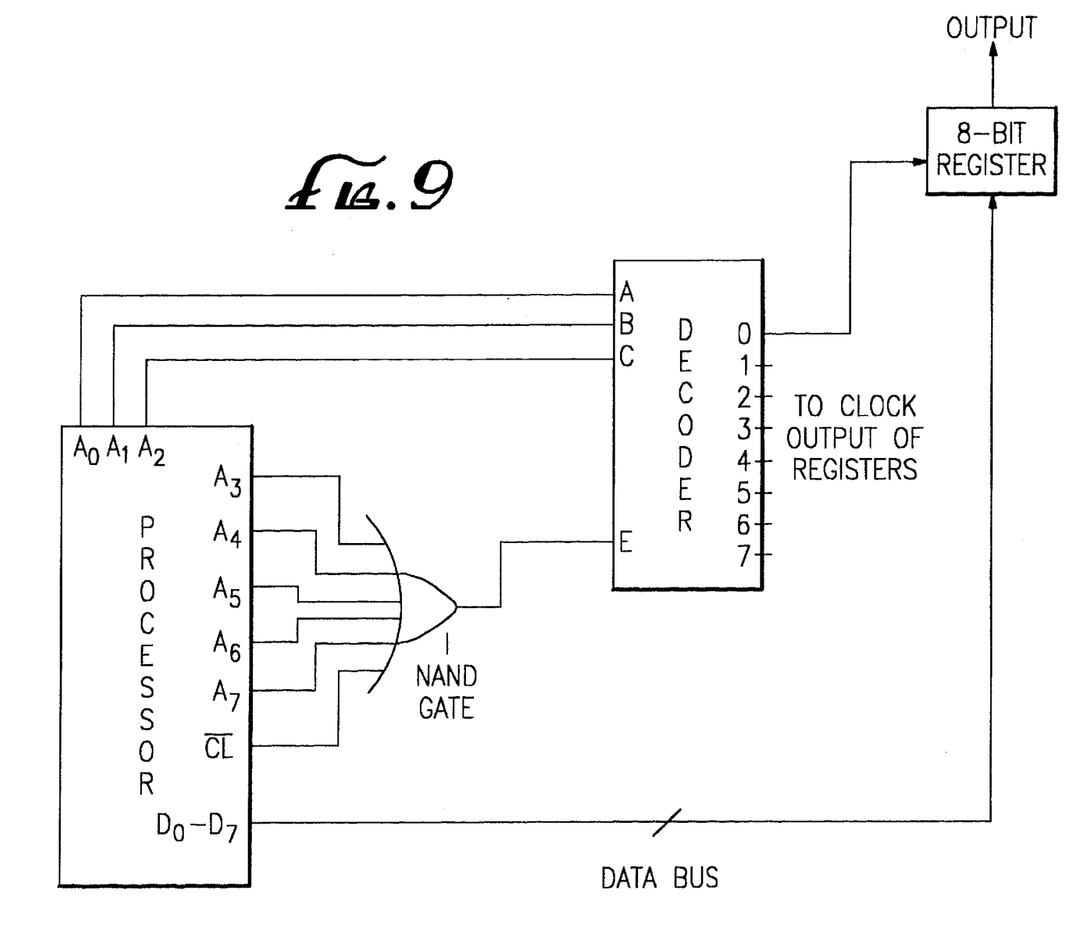

FIG. 9 illustrates a block diagram of an example embodiment of an output system for the data collector of the present invention. The output system can be utilized fir various data output functions, including downloading data to a register system, writing data to RAM or displaying data on a display. The output system uses the CPU to transmit output data via the data bus. The output system includes a 3 to 8 decoder, and a small area in RAM used as a temporary "scratch pad" for use by the CPU.

Figure 10:
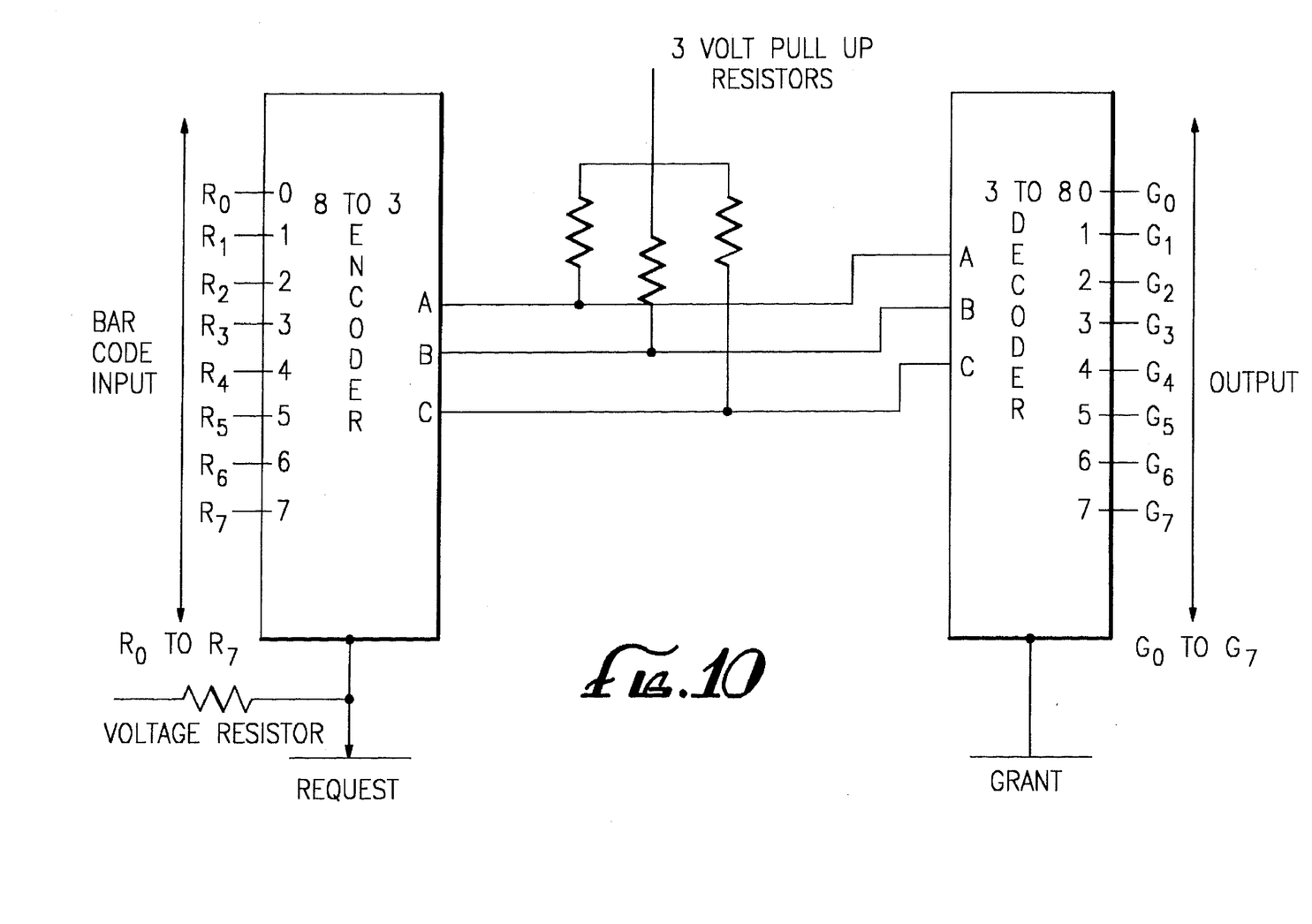

FIG. 10 illustrates a block diagram of an example embodiment of a input decoder system for the data collector of the present invention. The input decoder system includes an 8 to 3 encoder and a 3 to 8 parity decoder interconnected as shown. These encoder and decoder are manufactured by Hitachi, Texas Instruments and Motorola. The input decoder section decodes the input bar code information into digital bytes. To simplify the action of the decoder, the decoder system utilize a 3-bit signal from the bar code encoder A/1, B/2, C/3, and converts that signal to a digital format to be sent to the CPU via the main bus.

Figure 11:
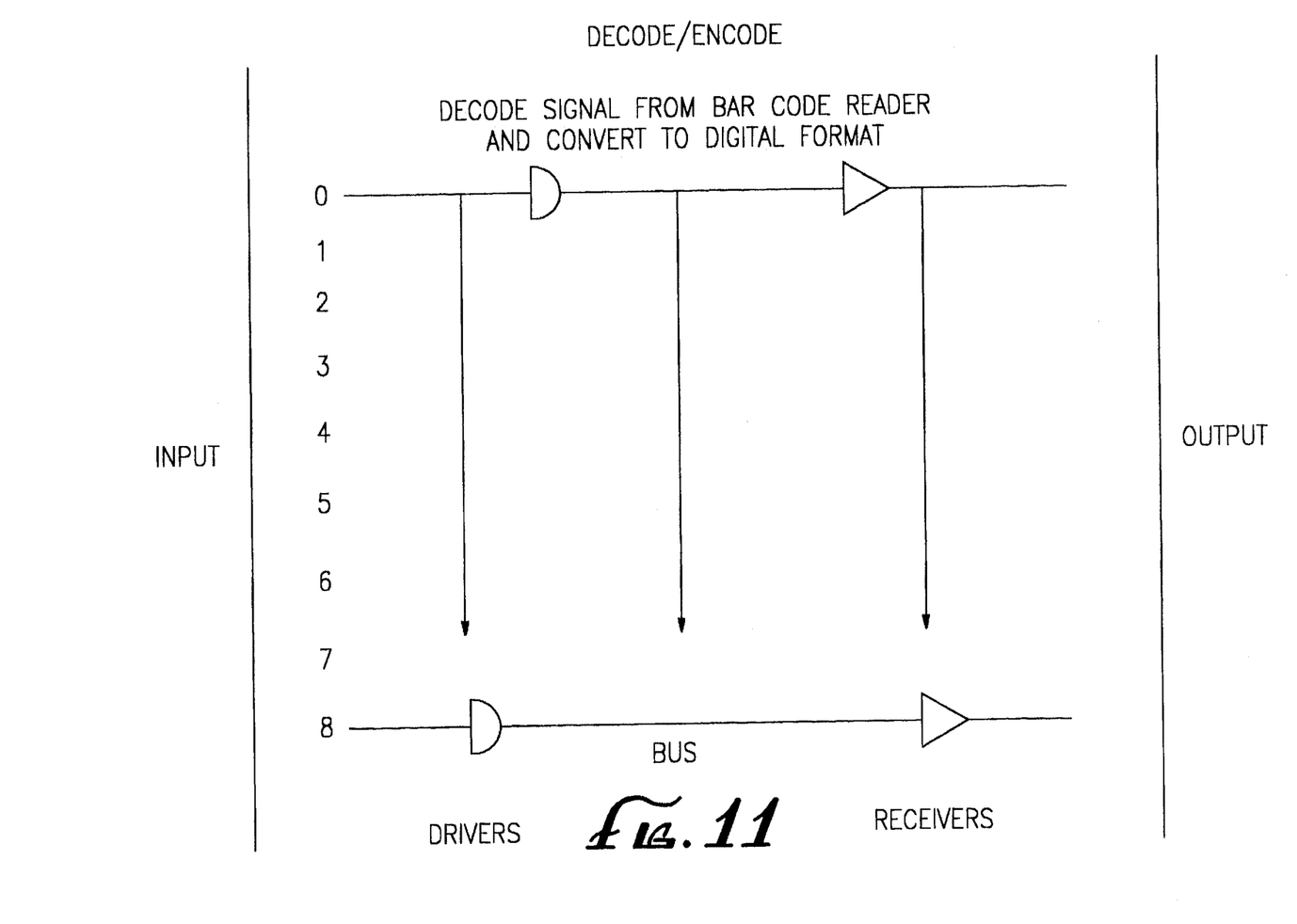

FIG. 11 illustrates a block diagram of an example embodiment of a decode/encode circuit for the data collector of the present invention.

The present invention has been described in considerable detail with reference to certain preferred versions thereof; however, other versions are possible. For example, the product list in the first memory device can include bar code form information instead of UPC code, where the bar code is used for comparison to find a match. Therefore, the spirit and scope of the appended claims should not be limited to the description of the preferred versions contained herein.

What is claimed is:

1. A self-contained personal data collector for redeeming product coupons having product code information in machine readable form thereon, the data collector comprising:

(a) a first memory device containing a product coupon list having a plurality of entries, each entry including product code information for a product;

(b) a scanner for scanning machine readable product code information from a coupon;

(c) a comparator for comparing the scanned product code information with the entries of the product coupon list in the first memory device to find a match;

(d) a display for displaying the matched product code information;

(e) means for assigning a unique identifier to the matched product code information; and (f) a second memory device for storing a list of matched product code information and corresponding unique identifiers as individual item entries, wherein the item entries can be retrieved and tallied by a register at a product purchase location.

2. The data collector of claim 1 wherein:
(a) the product code information on the coupon is in bar code form and the product code information for each entry of the coupon list includes a UPC bar code numeric code and product information in ASCII form;
(b) the data-collector further comprises a converter for converting the scanned coupon information from bar code form to UPC form; and
(c) the comparator compares the coupon information with the UPC code of each entry of the coupon list.

3. The data collector of claim 2 further comprising a third memory device for storing the scanned and unmatched bar code information for retrieval and accounting by said register.

4. The data collector of claim 2 wherein the product information includes coupon value, expiration date, and product identification.

5. The data collector of claim 4 wherein each entry in the coupon list further includes a product description, and the display displays the product information and the product description.

6. The collector of claim 1 further comprising user input means for allowing a user to elect storing the matched product code information in the second memory device.

7. The collector of claim 6 wherein the user input means further allows a user to delete an item entry from the list in the second memory device.

8. The collector of claim 7 wherein the user input means further allows a user to display a catalog of the item entries in the list stored in the second memory device on the display.

9. The collector of claim 1 further comprising means for downloading the item entries from the second memory device to the register.

10. A self-contained personal data collector for redeeming product coupons having product code information in machine readable form thereon, the data collector comprising:
(a) a first memory device containing a product coupon list having a plurality of entries, each entry including a UPC bar code numeric code and product information in ASCII form, wherein the product information includes coupon value, expiration date, product identification, and product description;
(b) a scanner for scanning machine readable product code information from a coupon;
(c) a converter for converting the scanned coupon information from bar code form to UPC code;
(d) a comparator for comparing the converted UPC code information with the UPC code of each entry of the product coupon list in the first memory device to find a match;
(e) a display for displaying the matched product code information;
(f) means for assigning a unique identifier to the matched product code information;
(g) a second memory device for storing a list of matched product code information and corresponding unique identifiers as individual item entries, wherein the item entries can be retrieved and tallied by a register at a product purchase location;
(h) a third memory device for storing the scanned and unmatched bar code information for retrieval and accounting by said register; and
(i) user input means for allowing a user to: (1) elect storing the matched product code information in the second memory device; (2) delete an item entry from the list in the second memory device; and (3) display a catalog of the item entries in the list stored in the second memory device on the display.

11. The collector of claim 10 further comprising means for downloading the item entries from the second memory device and from the third memory device 28 to the register.

12. A method of redeeming product coupons having product code information in machine readable form thereon, the method comprising the steps of:
(a) scanning machine readable product code information from a coupon;
(b) comparing the scanned product code information with a product coupon list stored in a first memory device to find a match, the list having a plurality of entries, each entry including product code information for a product;
(c) displaying the matched product code information on a display;
(d) assigning a unique identifier to the matched product code information; and
(e) storing a list of matched product code information and corresponding unique identifiers as individual item entries in a second memory device, wherein the item entries can be retrieved and tallied by a register at a product purchase location.

13. The method of claim 12 wherein the product code information on the coupon is in bar code form and the product code information in each entry of the coupon list includes a UPC code and production information in ASCII form, and wherein the method further comprises the step of converting the scanned coupon information from bar code form to UPC code, and the step of comparing comprises comparing the converted UPC code with the UPC code of each entry of the coupon list.

14. The method of claim 13 further comprising the step of storing the scanned and unmatched bar code information in a third memory device for retrieval and accounting by said register.

15. The method of claim 13 wherein the product information includes coupon value, expiration date, and product identification.

16. The method of claim 15 wherein each entry in the coupon list further includes a product description, and the step of displaying comprises displaying the product information and the product description.

17. The method of claim 12 further comprising the step of accepting user input for allowing a user to elect storing the matched product code information in the second memory device.

18. The method of claim 17 wherein the step of accepting user input includes accepting user input to allow a user to delete an item entry from the list in the second memory device.

19. The method of claim 18 wherein the step of accepting user input includes accepting user input to display a catalog of the item entries in the list stored in the second memory device on a display.

20. The method of claim 12 further comprising the step of downloading the item entries from the second memory device to a register at a product purchase location for tallying.

21. A system for redeeming product coupons, comprising:
(a) a self-contained personal data collector for reading product coupons having product code information in machine readable form thereon, the data collector comprising:

(i) a first memory device containing a coupon list having a plurality of entries, wherein each entry includes product code information for a product;
(ii) a scanner for scanning machine readable product code information from a coupon;
(iii) a comparator for comparing the scanned product code information with the entries of the coupon list in the first memory device to find a match;
(iv) a display for displaying the matched product code information;
(v) means for assigning a unique identifier to the matched product code information;
(vi) a second memory device for storing at least one item entry, wherein each item entry includes a matched product code information and a corresponding unique identifier; and
(vii) means for downloading the item entries from the second memory device; and (b) a register system located at a product purchase location to communicate with the downloading means of the data collector for retrieving and tallying the item entries in the second memory device of the data collector and for redemption of the tallied entries against corresponding products selected for purchase.

22. The system of claim 21 wherein:
(a) the product code information on the coupon is in bar code form and the product code information for each entry of the coupon list in the data-collector includes a UPC bar code numeric code and product information in ASCII form;
(b) the data-collector further comprises a converter for converting the scanned coupon information from bar code form to UPC form; and
(c) the comparator of the data-collector compares the coupon information with the UPC code of each entry of the coupon list.

23. The system of claim 22 wherein the data collector further comprises a third memory device for storing the scanned and unmatched bar code information for retrieval and accounting by said register system.

24. The system of claim 22 wherein the product information includes coupon value, expiration date, and product identification.

25. The system of claim 24 wherein each entry in the coupon list of the data collector further includes a product description, and the display displays the product information and the product description.

26. The system of claim 21 wherein the data collector further comprises user input means for allowing a user to elect storing the matched product code information in the second memory device.

27. The system of claim 26 wherein the user input means further allows a user to delete an item entry from the list in the second memory device.

28. The system of claim 27 wherein the user input means further allows a user to display a catalog of the item entries in the list stored in the second memory device on the display.

* * * * *